(12) United States Patent
Murai et al.

(10) Patent No.: US 11,090,603 B2
(45) Date of Patent: Aug. 17, 2021

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Shinji Murai, Sagamihara (JP); Yasuhiro Kato, Kawasaki (JP); Akiko Suzuki, Ota (JP); Mitsuru Udatsu, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 216 days.

(21) Appl. No.: 16/361,489

(22) Filed: Mar. 22, 2019

(65) Prior Publication Data

US 2019/0358579 A1    Nov. 28, 2019

(30) Foreign Application Priority Data

May 25, 2018    (JP) .............................. JP2018-100707

(51) Int. Cl.
  B01D 53/14    (2006.01)
(52) U.S. Cl.
  CPC ..... B01D 53/1475 (2013.01); B01D 53/1425 (2013.01); B01D 53/1468 (2013.01); B01D 53/1493 (2013.01); *B01D 2252/20442* (2013.01); *B01D 2252/20447* (2013.01); *B01D 2252/20468* (2013.01); *B01D 2252/20489* (2013.01)
(58) Field of Classification Search
  CPC ...... B01D 2252/0489; B01D 2252/504; B01D 2252/20468; B01D 2252/20442; B01D 2252/20431; B01D 53/1468; B01D 53/1493; B01D 2252/20484; B01D 2252/20426; B01D 53/1425; B01D 2252/20436; B01D 53/78; B01D 53/526; B01D 53/62; B01D 2257/304; B01D 2257/504; B01D 2258/0283; B01D 53/1475
  See application file for complete search history.

(56) References Cited

U.S. PATENT DOCUMENTS 3,856,921 A * 12/1974 Shrier ................ B01D 53/1493
                                                    423/228
6,036,931 A    3/2000 Yoshida et al.
7,374,734 B2    5/2008 Grossman et al.
9,321,007 B2 *  4/2016 Rochelle ............ B01D 53/1475
10,850,227 B2 * 12/2020 Murai ..................... B01D 53/62
2013/0343974 A1 12/2013 Murai et al.
2014/0178279 A1  6/2014 Svendsen et al.
2014/0290483 A1 10/2014 Delfort et al.
2015/0073150 A1 * 3/2015 Rochelle ............ B01D 53/1475
                                                    544/402
2016/0136568 A1 * 5/2016 Murai ................ B01D 53/1425
                                                    95/149
2016/0144314 A1  5/2016 Gonnard et al.
(Continued)

FOREIGN PATENT DOCUMENTS

CN    103505994 A    1/2014
EP    3 461 552 A1    4/2019
(Continued)

*Primary Examiner* — Timothy C Vanoy
(74) *Attorney, Agent, or Firm* — Oblon, McClelland, Maier & Neustadt, L.L.P.

(57) ABSTRACT

An acidic gas absorbent contains an amine compound of formula (1) and a cyclic amino compound of formula (2) or (3):

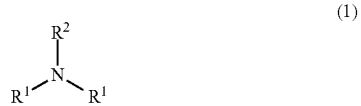

(1)

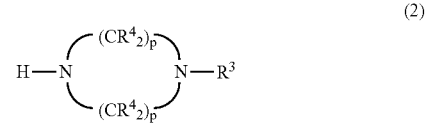

(2)

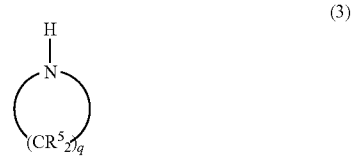

(3)

where in the formulas, each $R^1$ is independently a straight-chain hydroxyalkyl having a hydroxy at the terminal, $R^2$ is a branched-chain secondary alkyl group, $R^3$ and $R^4$ are hydrogen, hydroxy, a hydroxyalkyl or aminoalkyl, provided that at least one of $R^3$ and $R^4$s is a hydroxyalkyl or aminoalkyl, each p is independently an integer of 2 to 4, each $R^5$ is independently hydrogen, hydroxy, or a hydroxyalkyl or aminoalkyl, provided that at least one of $R^5$s is a hydroxyalkyl or aminoalkyl, and q is an integer of 3 to 8.

5 Claims, 1 Drawing Sheet

(56) References Cited

U.S. PATENT DOCUMENTS

2016/0280839 A1    9/2016  Watando et al.
2019/0160422 A1    5/2019  Murai et al.

FOREIGN PATENT DOCUMENTS

| | | |
|---|---|---|
| JP | 05-301024 | 11/1993 |
| JP | 2006-518662 | 8/2006 |
| JP | 2008-168184 | 7/2008 |
| JP | 2014-004533 | 1/2014 |
| JP | 2014-520661 | 8/2014 |
| JP | 2016-529087 | 9/2016 |
| JP | 2016-179418 | 10/2016 |
| JP | 2017-196547 | 11/2017 |
| JP | 2019-98316 A | 6/2019 |
| KR | 10-2011-0001741 A | 1/2011 |
| WO | WO 2011/002145 A2 | 1/2011 |

* cited by examiner

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2018-100707, filed on May 25, 2018, the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere.

Technical means for reducing the concentration increase of acidic gases, such as $CO_2$, include: development of energy-saving products; technologies for utilizing the acidic gases as a resource or for separating and storing the acidic gases; and conversion to alternative energy such as natural or atomic energy, which emits no acidic gases. Technologies for separating and recovering emitted acidic gases are also known as a kind of those technical means.

Acidic gas separation technologies that have been researched and developed until today are, for example, an absorbing method, an adsorbing method, a membrane separation method and a cryogenic method. Among them, the absorbing method is suitable for treating a large amount of gases efficiently, and hence is considered to be adopted in factories and power plants.

As the method mainly used in fossil-fuel consumers such as thermal power plants, there is a known process in which exhaust fumes generated by burning fossil fuels (e.g., coal, oil, natural gas) are brought into contact with a chemical absorbent so as to remove and recover $CO_2$ in the combustion exhaust fumes. Further, there is also a known process for storing the recovered $CO_2$. Furthermore, it is proposed to remove acidic gases other than $CO_2$, such as hydrogen sulfide ($H_2S$), by use of the chemical absorbent.

As the chemical absorbent employed in the absorbing method, alkanol amines typified by monoethanolamine (MEA) have been developed since about 1930s and are still in practical use today. This method is economical and makes it easily to scale up the removal apparatus.

Examples of alkanol amines generally adopted in the absorbing method include: 2-amino-2-methylpropanolamine, methylaminoethanol, ethylaminoethanol, propylaminoethanol, diethanolamine, methyldiethanolamine, dimethylethanolamine, diethylethanolamine, triethanolamine, and dimethylamino-1-methylethanol.

When those amines are singly employed, the rate of $CO_2$ absorption is often insufficient. Accordingly, they are usually used in combination with reaction-promoting compounds. As the reaction-promoting compounds, cyclic diamines are known. However, they generally have such high vapor pressures as to easily vaporize and diffuse, and hence are often poor in handling property.

Meanwhile, in the process for recovering carbon dioxide, the absorption step of carbon dioxide into an aqueous amine solution and the desorption step of the absorbed carbon dioxide from the solution are required to proceed with high efficiency. Further, energy consumed in those steps for recovering carbon dioxide is also required to be small. To meet those requirements, it is effective to adopt an absorbent having large absorbing capacity. At the same time, in view of environmental influences, it is also required to reduce as much as possible the amount of amine emitted into the atmosphere.

Japanese Translation of PCT International Application Publication No. 2006-518662 discloses an absorbent for removing an acidic gas from a fluid. This absorbent contains a tertiary alkanolamine in combination with hydroxyethylpiperazine or the like.

Japanese Patent Laid-Open No. 2008-168184 discloses a composition for recovering carbon dioxide from exhaust fumes. This composition contains diethanolamine in combination with a piperazine compound.

Japanese Translation of PCT International Application Publication No. 2016-529087 discloses various amines and combinations thereof. As an example of the combinations, it refers to a mixture of primary or secondary amines serving as an activator used in combination with a tertiary amine. Specifically, in the publication, the tertiary amine and the primary or secondary amines usable in combination are exemplified by tert-butyldiethanolamine or the like and by N-(2-hydroxyethyl)piperazine or the like, respectively.

Japanese Translation of PCT International Application Publication No. 2014-520661 discloses a water-soluble liquid $CO_2$ absorbent. This absorbent contains two or more amine compounds, at least one of which is a tertiary amine and at least another of which is a primary or secondary amine. In the publication, the tertiary amine and the primary or secondary amine are exemplified by DIPAE (2-diisopropylaminoether) or N-TBDEA (N-tert-butyldiethanolamine) and by HEP (1-piperazineethanol) or the like, respectively.

Japanese Patent Laid-Open No. H5(1993)-301024 discloses an aqueous mixture comprising amine compounds in combination. This mixture is used in a process for removing carbon dioxide from combustion discharge gases. In the publication, the tertiary amine and the secondary amine contained in the aqueous mixture are exemplified by t-butyldiethanolamine or the like and by 2-piperazineethanol or the like, respectively.

However, any known absorbent cannot realize both large absorbing capacity and small diffusion of amine at the same time, and hence it is desired to provide a new absorbent capable of realizing both of them.

DETAILED DESCRIPTION

Embodiments will now be explained with reference to the accompanying drawings.

The acidic gas absorbent according to an embodiment of the present disclosure comprises: an amine compound represented by the following formula (1) and a cyclic amino compound represented by the following formula (2) or (3):

in which each $R^1$ is independently a straight-chain hydroxyalkyl group of 2 to 6 carbon atoms having a hydroxy group at the terminal, and $R^2$ is a branched-chain secondary alkyl group of 3 to 6 carbon atoms;

in which $R^3$ is hydrogen, hydroxy, or a hydroxyalkyl or aminoalkyl group of 1 to 8 carbon atoms, each $R^4$ is independently hydrogen, hydroxy, or a hydroxyalkyl or aminoalkyl group of 1 to 8 carbon atoms, provided that at least one of $R^3$ and $R^4$s is a hydroxyalkyl or aminoalkyl group of 1 to 8 carbon atoms, and each p is independently an integer of 2 to 4 provided that the cyclic skeleton in the formula (2) may contain an oxygen atom as a constituting member;

in which each $R^5$ is independently hydrogen, hydroxy, or a hydroxyalkyl or aminoalkyl group of 1 to 8 carbon atoms, provided that at least one of $R^5$s is a hydroxyalkyl or aminoalkyl group of 1 to 8 carbon atoms, and q is an integer of 3 to 8 provided that the cyclic skeleton in the formula (3) may contain an oxygen atom as a constituting member.

Further, in the acidic gas removal method according to another embodiment of the present disclosure, a gas containing an acidic gas is brought into contact with the above acidic gas absorbent so as to remove the acidic gas from the acidic gas-containing gas.

Furthermore, the acidic gas removal apparatus according to still another embodiment of the present disclosure comprises:

an absorption unit in which a gas containing an acidic gas is brought into contact with the above acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

In the following description, the embodiments will be explained mainly in case examples where the acidic gas is carbon dioxide ($CO_2$). However, the acidic gas absorbent according to the embodiment can give the same effect on other acidic gases such as hydrogen sulfide. Specifically, the absorbent of the embodiment is particularly suitable to absorb oxidizing gases such as carbon dioxide and hydrogen sulfide.

The acidic gas absorbent according to the embodiment of the present disclosure comprises a particular amine compound represented by the following formula (1) and a particular cyclic secondary amine compound represented by the following formula (2) or (3).

The acidic gas absorbent of the first embodiment indispensably contains an amine compound represented by the following formula (1):

In the formula, each $R^1$ is independently a straight-chain hydroxyalkyl group of 2 to 6 carbon atoms having a hydroxy group at the terminal. Examples of $R^1$ include: hydroxyethyl, hydroxypropyl, hydroxybutyl, hydroxypentyl, and hydroxyhexyl. Among them, hydroxyethyl and hydroxypropyl are preferred.

Further, $R^2$ is a branched-chain secondary alkyl group of 3 to 6 carbon atoms. Here, the meaning of "branched-chain" includes that of "cyclic". Specifically, examples of $R^2$ include: isopropyl, sec-butyl, cyclobutyl, and cyclopentyl. Among them, isopropyl is preferred.

Examples of the amine compound represented by the formula (1) include:
N-isopropyldiethanolamine,
N-isopropyldipropanolamine,
N-isopropyldibutanolamine,
N-isopropyldipentanolamine,
N-isopropyldihexanolamine,
3-[(2-hydroxyethyl)(propan-2-yl)amino]propan-1-ol,
4-[(2-hydroxyethyl)(propan-2-yl)amino]butan-1-ol,
5-[(2-hydroxyethyl)(propan-2-yl)amino]pentan-1-ol,
6-[(2-hydroxyethyl)(propan-2-yl)amino]hexan-1-ol,
N-sec-butyldiethanolamine,
N-sec-butyldipropanolamine,
N-sec-butyldibutanolamine,
N-sec-butyldipentanolamine,
N-sec-butyldihexanolamine,
3-[(2-hydroxyethyl)(butan-2-yl)amino]propan-1-ol,
4-[(2-hydroxyethyl)(butan-2-yl)amino]butan-1-ol,
5-[(2-hydroxyethyl)(butan-2-yl)amino]pentan-1-ol,
6-[(2-hydroxyethyl)(butan-2-yl)amino]hexan-1-ol,
N-cyclopentyldiethanolamine,
N-cyclopentyldipropanolamine,
3-[(2-hydroxyethyl)(cyclopentyl)amino]propan-1-ol,
4-[(2-hydroxyethyl)(cyclopentyl)amino]butan-1-ol,
5-[(2-hydroxyethyl)(cyclopentyl)amino]pentan-1-ol, and
6-[(2-hydroxyethyl)(cyclopentyl)amino]hexan-1-ol.

Among them, it is preferred to select the compound from the group consisting of:
N-isopropyldiethanolamine,
N-isopropyldipropanolamine,
3-[(2-hydroxyethyl)(propan-2-yl)amino]propan-1-ol,
N-sec-butyldiethanolamine, N-sec-butyldipropanolamine,
N-sec-butyldibutanolamine,
3-[(2-hydroxyethyl)(butan-2-yl)amino]propan-1-ol,
N-cyclopentyldiethanolamine,
N-cyclopentyldipropanolamine, and
3-[(2-hydroxyethyl)(cyclopentyl)amino]propan-1-ol.

Those compounds can be used singly or in combination of two or more. The acidic gas absorbent contains the particular amine compound represented by the formula (1) in an amount of preferably 10 to 60 wt %, more preferably 20 to 50 wt %.

It is generally preferred for the amine concentration to be high in view of energy consumption, plant scale and processing efficiency. That is because carbon dioxide is absorbed and desorbed in large amounts per unit volume and further the rates thereof are high when the amine compound is contained in a high concentration.

However, if the amine concentration is too high, the absorbent may have increased viscosity. This tendency is not observed when the absorbent contains the amine compound of the formula (1) in an amount of 60 wt % or less. On the other hand, if the amine compound of the formula (1) is contained in an amount of 10 wt % or more, carbon dioxide can be absorbed in a sufficient amount at a favorable rate to realize excellent processing efficiency.

The acidic gas absorbent containing the amine compound of the formula (1) in an amount within the above range is not only capable of absorbing $CO_2$ in a large amount at a high rate but also capable of desorbing $CO_2$ in a large amount at a high rate. Accordingly, when adopted for $CO_2$ recovery, the absorbent has the advantage of efficiently recovering carbon dioxide.

The acidic gas absorbent according to the embodiment contains at least one kind of particular cyclic secondary amine compounds, one of which is represented by the following formula (2):

(2)

In the formula, $R^3$ is hydrogen, hydroxy, or a hydroxyalkyl or aminoalkyl group of 1 to 8 carbon atoms; and each $R^4$ is independently hydrogen, hydroxy, or a hydroxyalkyl or aminoalkyl group of 1 to 8 carbon atoms. The plural $R^4$s may be the same as or different from each other. They may be also the same as or different from $R^3$ provided that at least one of $R^3$ and $R^4$s is a hydroxyalkyl or aminoalkyl group of 1 to 8 carbon atoms. This means that the compound of the formula (2) contains at least one hydroxyalkyl group or aminoalkyl group in its molecular structure.

Examples of the hydroxyalkyl group include: hydroxyethyl, hydroxypropyl, hydroxypentyl, hydroxyhexyl, hydroxyheptyl, and hydroxyoctyl. Examples of the aminoalkyl group include: aminoethyl, aminopropyl, aminopentyl, aminohexyl, aminoheptyl, and aminosioctyl. Among them, hydroxyethyl and hydroxypropyl are preferred.

Each p independently means an integer of 2 to 4. Accordingly, the compound of the formula (2) contains a 6- to 10-membered heterocyclic skeleton.

The heterocyclic skeleton may contain an oxygen atom as a constituting member.

Another kind of the cyclic secondary amine compounds is represented by the following formula (3):

(3)

In the formula, each $R^5$ is independently hydrogen, hydroxy, or a hydroxyalkyl or aminoalkyl group of 1 to 8 carbon atoms. The plural $R^5$s may be the same as or different from each other. At least one of $R^5$s is a hydroxyalkyl or aminoalkyl group of 1 to 8 carbon atoms. This means that the compound of the formula (3) contains at least one hydroxyalkyl group or aminoalkyl group in its molecular structure.

Examples of the hydroxyalkyl group include: hydroxyethyl, hydroxypropyl, hydroxypentyl, hydroxyhexyl, hydroxyheptyl, and hydroxyoctyl. Examples of the aminoalkyl group include: aminoethyl, aminopropyl, aminopentyl, aminohexyl, aminoheptyl, and aminooctyl. Among them, hydroxyethyl and hydroxypropyl are preferred.

In the above formula, q is an integer of 3 to 8. Accordingly, the compound of the formula (3) contains a 4- to 9-membered heterocyclic skeleton.

The heterocyclic skeleton may contain an oxygen atom as a constituting member.

Examples of the cyclic secondary amine compound represented by the formula (2) or (3) include:
2-azetidinemethanol,
2-(2-aminoethyl)azetidine,
2-pyrrolidinemethanol,
2-(2-aminoethyl)pyrrolidine,
2-piperidinemethanol,
3-piperidineethanol,
2-(2-aminoethyl)pyrrolidine,
1-(2-hydroxyethyl)piperazine,
2-(hydroxymethyl)piperazine,
3-hydroxypyrrolidine,
3-pyrrolidinemethanol,
2-(2-hydroxyethyl)pyrrolidine,
4-piperidineethanol,
3-hydroxypiperidine,
4-hydroxypiperidine,
4-(hydroxymethyl)piperidine,
N-(2-aminoethyl)piperazine, and
3-aminopiperidine.

Among them, it is preferred to select the compound from the group consisting of:
2-azetidinemethanol,
2-(2-aminoethyl)azetidine,
2-pyrrolidinemethanol,
2-(2-aminoethyl)pyrrolidine,
4-hydroxypiperidine,
2-piperidinemethanol,
3-piperidineethanol,
2-(2-aminoethyl)pyrrolidine,
1-(2-hydroxyethyl)piperazine, and
2-(hydroxymethyl)piperazine.

The cyclic amine compounds represented by the formula (2) and those represented by the formula (3) can be employed in combination.

In the present embodiment, for example, an aqueous solution of the amine compound (1) and the cyclic amine compound (2) or (3) can be adopted as the acidic gas absorbent, which is particularly preferred in view of $CO_2$ absorption capacity and rate per unit mol and per unit volume of the absorbent. Further, energy for separating the acidic gas after $CO_2$ absorption (namely, desorption energy) can be so lowered as to reduce energy for regenerating the absorbent.

The acidic gas absorbent contains the compound represented by the formula (2) or (3) in an amount of preferably 1 to 50 wt %, more preferably 3 to 50 wt % (provided that the whole amount of the absorbent is regarded as 100 wt %). If the compound of (2) or (3) is contained in an amount of less than 1 wt %, it may be impossible to enhance the rate of acidic gas absorption. On the other hand, if the above particular cyclic amine compound is contained in an amount of more than 50 wt %, the absorbent may have such high viscosity as to impair the reactivity.

<Optional Ingredients>

The acidic gas absorbent according to the embodiment contains the amine compound of the formula (1) and the cyclic amine compound of the formula (2) or (3), and it can further contain other optional ingredients according to necessity.

Examples of the optional ingredients include aminoalcohols, which can improve, for example, absorption capacity, desorption amount, absorption rate and the like of the acidic gas absorbent.

Preferred examples of the aminoalcohols include: monoethanolamine, 2-amino-2-methyl-1-propanol, 2-amino-2-methyl-1,3-dipropanol, diethanolamine, bis(2-hydroxy-1-methyethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, and diethanolamine. Those compounds can be used singly or in combination of two or more.

Among those compounds, it is preferred to select at least one alkanolamine from the group consisting of 2-(isopropylamino)ethanol and 2-amino-2-methyl-1-propanol in view of improving the reactivity between the acidic gas and the amine compounds represented by the formulas (1) to (3).

When those aminoalcohols are incorporated, the amount thereof is preferably 1 to 30 vol % based on 100 vol % of the amine compound represented by the formula (1).

Further, the absorbent can also contain cyclic amine compounds other than those of (2) or (3).

Examples of the cyclic amine compounds include: azetidine, 1-methylazetidine, 1-ethylazetidine, 2-methylazetidine, 2-azetidylmethanol, 2-(2-aminoethyl)azetidine, pyrrolidine, 1-methylpyrrolidine, 2-methylpyrrolidine, 2-butylpyrrolidine, piperidine, 1-methylpiperidine, 2-ethylpiperidine, 3-propylpiperidine, 4-ethylpiperidine, hexahydro-1H-azepine, piperazine and piperazine derivatives.

Among them, piperazine derivatives are particularly preferred in view of improving $CO_2$ absorption amount and rate of the absorbent.

A piperazine derivative is a kind of secondary amine compounds, and hence has a secondary amino group. In the early stage of the reaction, the nitrogen atom in the secondary amino group is combined with carbon dioxide to form a carbamate ion and thereby the derivative contributes toward improvement of the absorption rate. Further, also in the later stage of the reaction, the nitrogen atom in the secondary amino group plays the role of converting the combined carbon dioxide into a bicarbonate ion ($HCO_3^-$) and thereby the derivative contributes toward improvement of the absorption rate.

The piperazine derivative is preferably at least one selected from 2-methylpiperazine, 2,5-dimethylpiperazine or 2,6-dimethylpiperazine. Further, hexamethylenetetramine can be also used in combination with the cyclic amine compound represented by the formula (2) or (3).

The absorbent according to the embodiment may contain a solvent such as water. When water is used as the solvent, the amount thereof is preferably 20 to 70 wt %, more preferably 30 to 70 wt %, or 20 to 60 wt %, still more preferably 30 to 60 wt % (provided that the whole amount of the absorbent is regarded as 100 wt %). The amount of water is preferably within the above range in view of preventing viscosity increase of the absorbent and of inhibiting foaming when the absorbent absorbs carbon dioxide.

Further, examples of the optional ingredients also include oxidation inhibitors, pH adjusters, defoaming agents, and anticorrosive agents.

Preferred examples of the oxidation inhibitors include: dibutylhydroxytoluene (BHT), butylhydroxyanisole (BHA), sodium erythorbate, sodium nitrite, sulfur dioxide, 2-mercaptoimidazole and 2-mercaptobenzimidazole. When the oxidation inhibitor is incorporated, the amount thereof is preferably 0.01 to 1 wt %, more preferably 0.1 to 0.5 wt % (provided that the whole amount of the absorbent is regarded as 100 wt %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 wt %, more preferably 0.0005 to 0.001 wt % (provided that the whole amount of the absorbent is regarded as 100 wt %). The defoaming agent can inhibit foaming of the absorbent so as to prevent decrease of absorption and desorption efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 wt %, more preferably 0.00005 to 0.005 wt % (provided that the whole amount of the absorbent is regarded as 100 wt %). The anticorrosive agent prevents corrosion of the plant facilities to extend the working lifetime thereof.

As described above, the acidic gas absorbent of the present embodiment can increase the amount of absorbed acidic gas such as carbon dioxide and also can reduce diffusion of the reaction promoter. In addition, it is only a small amount of energy that is necessary for recovering the acidic gas. Further, since the absorbent contains an amine compound having plural polar hydroxy groups in its molecule, the diffusibility thereof is kept at such a low level as to prevent the compound from leaking out of the reaction apparatus. Accordingly, even if the amine compound is used in combination with a reaction promoter of low vapor pressure, the absorbent can stably process the acidic gas for a long time. Furthermore, the absorbent has not only high reactivity with acidic gases (such as, carbon dioxide ($CO_2$), hydrogen sulfide ($H_2S$) and carbonyl sulfide (COS)) but also excellent solubility in water, and hence is hardly deposited when absorbing those acidic gases.

The acidic gas absorbent containing the compounds according to the embodiment is remarkably improved in absorption capacity of acidic gases (particularly, carbon dioxide) per unit mol and in absorption capacity and rate of acidic gases per unit volume of the absorbent. Further, the absorbent of the embodiment also can reduce the amounts of amines emitted from the absorption tower and the regeneration tower.

<Acidic Gas Removal Method>

In the acidic gas removal method according to the embodiment, a gas containing an acidic gas is brought into contact with the above acidic gas absorbent so as to remove the acidic gas from the acidic gas-containing gas.

The acidic gas removal method of the embodiment basically comprises: a step (absorption step) in which the aforementioned absorbent of the embodiment is made to absorb an acidic gas; and another step in which the acidic gas-holding absorbent of the embodiment is made to release the absorbed acidic gas.

Specifically, the acidic gas removal method according the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to desorb and remove the acidic gas from the absorbent.

There are no particular restrictions on how an acidic gas-containing gas is brought into contact with an aqueous solution containing the above acidic gas absorbent. For example, the acidic gas-containing gas may be bubbled in the absorbent; the absorbent may be sprayed in the form of mist into a stream of the acidic gas-containing gas (spray method); or otherwise the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated and boiled up in a pot in the same way as distillation, or otherwise the absorbent may be heated while the liquid interface thereof is spread in a plate column, in a spray tower or in a regeneration tower filled with a ceramic or metal mesh filler. As a result of those treatments, the acidic gas is desorbed and released from carbamate anions and/or bicarbonate ions.

When the acidic gas is desorbed, the acidic gas absorbent is kept at a temperature of normally 70° C. or more, preferably 80° C. or more, further preferably 90 to 120° C. The higher the temperature is, the more the acidic gas is desorbed. However, in order to raise the temperature, it is necessary to increase energy for heating the absorbent. Accordingly, the temperature can be determined according to the gas temperature in the process and to the heat recovery target or the like. The pressure in the step of desorbing the acidic gas can be normally set at about 1 to 3 atm. Although the pressure can be reduced to enhance the desorption performance, the process is preferably carried out in the above range so as to save energy consumption used for pressure reduction.

After the acidic gas is desorbed, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has such a high purity as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

Among the above steps, the most energy is consumed in the step where the acidic gas is desorbed from the acidic gas absorbent to regenerate the absorbent. Specifically, this step often consumes about 50 to 80% of the energy used in all the steps. Accordingly, if it is realized to reduce energy consumption in the step of regenerating the absorbent, it becomes possible to lower the cost for absorbing and desorbing the acidic gas and, as a result, the acidic gas can be removed from exhaust fumes efficiently and economically advantageously.

The acidic gas absorbent according to the embodiment can reduce energy necessary for desorbing the acidic gas (namely, for the regeneration step), and therefore the $CO_2$ absorption and desorption steps can be carried out efficiently and economically advantageously.

Further, the amine compound according the embodiment has remarkably high anticorrosive properties for metallic materials such as carbon steel, as compared with alkanol amines, such as 2-aminoethanol, which are conventionally used as acidic gas absorbents. Accordingly, for example, in plant construction, the acidic gas removal method adopting the above absorbent makes it unnecessary to use very costly corrosion-resistant steel of high quality. The method according to the embodiment is thus advantageous in cost.

<Acidic Gas Removal Apparatus>

The acidic gas removal apparatus according to the embodiment comprises:

an absorption unit in which a gas containing an acidic gas is brought into contact with the aforementioned first or second acidic gas absorbent, so that the absorbent absorbs the acidic gas to remove it from the acidic gas-containing gas; and a regeneration unit in which the absorbent holding the acidic gas is made to desorb the acidic gas so as to be regenerated;

so that the absorbent regenerated in the regeneration unit is reused in the absorption unit.

Figure 1:
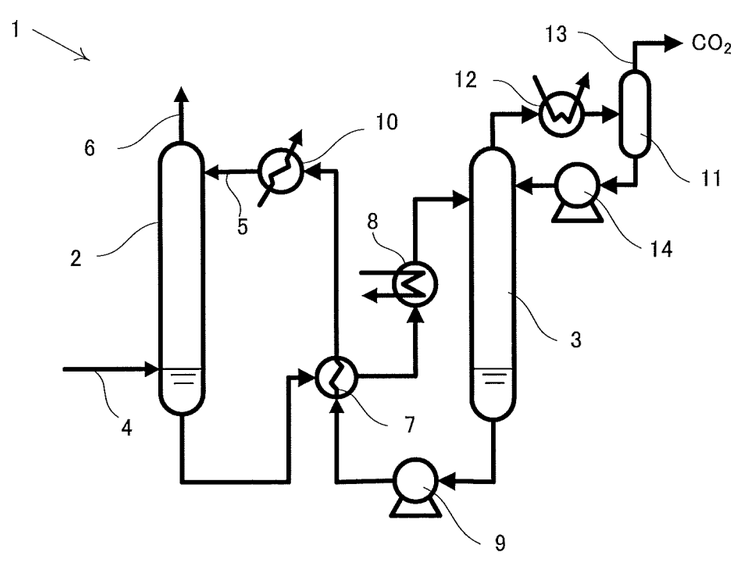
FIG. 1 schematically shows an acidic gas removal apparatus according to the embodiment.

FIG. 1 schematically shows the acidic gas removal apparatus according to the embodiment.

The acidic gas removal apparatus 1 comprises: an absorption unit 2 in which a gas containing an acidic gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to desorb the acidic gas so as to be regenerated.

In the following description, the explanation is given in case examples where the acidic gas is carbon dioxide.

As shown in FIG. 1, a discharge gas containing $CO_2$, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

The pH value of the absorbent must be adjusted at 9 or more, but it is preferred to control the pH value optimally according to various conditions, such as, the substance, concentration and flow rate of the harmful gas contained in the discharge gas.

The acidic gas absorbent may contain not only the aforementioned amine compounds and the solvent such as water, but also other compounds, such as, nitrogen-containing compounds that improve $CO_2$ absorption performance, antioxidants and pH adjusters, in desirable amounts.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 from the absorption unit 2.

The $CO_2$-holding absorbent is then sent to a heat exchanger 7 and a heater 8. After heated, the absorbent is introduced into the regeneration unit 3. In the regeneration unit 3, while the absorbent is moved down from the upper part to the lower part, the acidic gas is desorbed from the absorbent and thereby the absorbent is regenerated.

The absorbent regenerated in the regeneration unit 3 is sent by a pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The $CO_2$-containing reflux water is cooled with a reflux condenser 12, and thereafter separated in the reflux drum 11 into water and a liquid component condensed from water vapor accompanying $CO_2$. The liquid component is sent through an acidic gas recovering line 13 for the step of recovering the acidic gas. Meanwhile, the reflux water separated from the acidic gas is sent by a reflux water pump 14 into the regeneration unit 3.

The acidic gas removal apparatus 1 thus employs the acidic gas absorbent excellent in acidic gas absorption and desorption performance, and thereby makes it possible to absorb and remove acidic gases efficiently.

EXAMPLES

The embodiments of the present disclosure will be further explained by use of the following Examples and Comparative examples.

Example 1

In water, N-isopropyldiethanolamine and 1-piperazineethanol were dissolved so that the concentrations thereof might be 20 wt % and 20 wt %, respectively, to prepare 50 ml of an aqueous solution (which is hereinafter referred to as "absorbent"). The absorbent was placed in a test tube, heated at 40° C., and bubbled at a flow rate of 400 mL/minute with a gas mixture containing 10 vol % of carbon dioxide ($CO_2$) and 90 vol % of nitrogen ($N_2$). At an exit of the test tube, the $CO_2$ concentration was then measured to evaluate the absorption performance by means of an infrared gas analyzer (CGT-700 [trademark], manufactured by Shimadzu Corporation).

Independently, while the absorbent was bubbled with 100% $CO_2$ at 120° C./202 kPa, how much the absorbent absorbed $CO_2$ was measured to determine the recovered amount.

Further, while the above aqueous amine solution was bubbled with 1% $CO_2$ at 40° C., the diffused amine compound was collected to evaluate the diffusibility.

The amount of $CO_2$ absorption at 40° C. was found to be 0.49 mol per 1 mol of the amine compound in the absorbent. The amount of $CO_2$ absorption at 120° C. was 0.07 mol per 1 mol of the amine compound in the absorbent, and the recovered amount was 0.42 mol. As for the diffusibility, while nitrogen gas was bubbled in the absorbent, the absorbent accompanying nitrogen gas was collected to measure the amine concentration. As a result, the diffusibility was found to be about 1.2 ppm.

Example 2

The procedure of Example 1 was repeated except for replacing N-isopropyldiethanolamine with 3-[(2-hydroxyethyl)(propan-2-yl)amino]propan-1-ol, to prepare an absorbent. The amounts of $CO_2$ absorption, amine recovery and diffusion were evaluated with the same apparatus under the same conditions as in Example 1.

The amount of $CO_2$ absorption at 40° C. was found to be 0.48 mol per 1 mol of the amine compound in the absorbent. The amount of $CO_2$ absorption at 120° C. was 0.07 mol per 1 mol of the amine compound in the absorbent, and the recovered amount was 0.41 mol. The diffusibility was found to be about 1.4 ppm.

Example 3

The procedure of Example 1 was repeated except for replacing N-isopropyldiethanolamine with N-isopropyl-dipropanolamine, to prepare an absorbent. The amounts of $CO_2$ absorption, amine recovery and diffusion were evaluated with the same apparatus under the same conditions as in Example 1.

The amount of $CO_2$ absorption at 40° C. was found to be 0.47 mol per 1 mol of the amine compound in the absorbent. The amount of $CO_2$ absorption at 120° C. was 0.07 mol per 1 mol of the amine compound in the absorbent, and the recovered amount was 0.40 mol. The diffusibility was found to be about 1.6 ppm.

Example 4

The procedure of Example 1 was repeated except for replacing 1-piperazineethanol with 4-hydroxypiperidine, to prepare an absorbent. The amounts of $CO_2$ absorption, amine recovery and diffusion were evaluated with the same apparatus under the same conditions as in Example 1.

The amount of $CO_2$ absorption at 40° C. was found to be 0.50 mol per 1 mol of the amine compound in the absorbent. The amount of $CO_2$ absorption at 120° C. was 0.09 mol per 1 mol of the amine compound in the absorbent, and the recovered amount was 0.41 mol. The diffusibility was found to be about 3.0 ppm.

Example 5

The procedure of Example 1 was repeated except for replacing N-isopropyldiethanolamine with N-cyclopentyl-dipropanolamine, to prepare an absorbent. The amounts of $CO_2$ absorption, amine recovery and diffusion were evaluated with the same apparatus under the same conditions as in Example 1.

The amount of $CO_2$ absorption at 40° C. was found to be 0.46 mol per 1 mol of the amine compound in the absorbent. The amount of $CO_2$ absorption at 120° C. was 0.06 mol per 1 mol of the amine compound in the absorbent, and the recovered amount was 0.40 mol. The diffusibility was found to be about 2.8 ppm.

Comparative Example 1

In water, methyliminodiethanol and piperazineethanol were dissolved so that the concentrations thereof might be 20 wt % and 20 wt %, respectively, to prepare 50 ml of an aqueous solution (which is hereinafter referred to as "absorbent"). Thereafter, the amounts of $CO_2$ absorption, amine recovery and diffusion were evaluated with the same apparatus under the same conditions as in Example 1.

The amount of $CO_2$ absorption at 40° C. was found to be 0.44 mol per 1 mol of the amine compound in the absorbent. The amount of $CO_2$ absorption at 120° C. was 0.06 mol per 1 mol of the amine compound in the absorbent, and the recovered amount was 0.38 mol. The diffusibility was found to be about 1.5 ppm.

Comparative Example 2

In water, N-tert-butyldiethanolamine and 1-piperazineethanol were dissolved so that the concentrations thereof might be 20 wt % and 20 wt %, respectively, to prepare 50 ml of an aqueous solution (which is hereinafter referred to as "absorbent"). Thereafter, the amounts of $CO_2$ absorption, amine recovery and diffusion were evaluated with the same apparatus under the same conditions as in Example 1.

The amount of $CO_2$ absorption at 40° C. was found to be 0.42 mol per 1 mol of the amine compound in the absorbent. The amount of $CO_2$ absorption at 120° C. was 0.06 mol per 1 mol of the amine compound in the absorbent, and the recovered amount was 0.38 mol. The diffusibility was found to be about 4.0 ppm.

<Results>

As evident from the above results, the absorbents of Examples according to the embodiment showed larger amounts of $CO_2$ absorption and recovery than those of Comparative examples. In addition, the diffusibilities of Examples were equal or superior to those of Comparative examples.

It can be thus realized to absorb acidic gases such as carbon dioxide in large amounts by use of at least one of the embodiments, namely, the acidic gas absorbent, the acidic gas removal method and the acidic gas removal apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas absorbent comprising: an amine compound represented by the following formula (1) and a cyclic amino compound represented by the following formula (2) or (3):

wherein
each $R^1$ is independently a straight-chain hydroxyalkyl group of 2 to 6 carbon atoms having a hydroxy group at the terminal, and
$R^2$ is a branched-chain secondary alkyl group of 3 to 6 carbon atoms;

wherein
$R^2$ is hydrogen, hydroxy, or a hydroxyalkyl or aminoalkyl group of 1 to 8 carbon atoms,
each $R^4$ is independently hydrogen, hydroxy, or a hydroxyalkyl or aminoalkyl group of 1 to 8 carbon atoms,
provided that at least one of $R^3$ and $R^4$s is a hydroxyalkyl or aminoalkyl group of 1 to 8 carbon atoms, and
each p is independently an integer of 2 to 4 provided that the cyclic skeleton in the formula (2) may contain an oxygen atom as a constituting member;

wherein
each $R^5$ is independently hydrogen, hydroxy, or a hydroxyalkyl or aminoalkyl group of 1 to 8 carbon atoms,
provided that at least one of $R^5$s is a hydroxyalkyl or aminoalkyl group of 1 to 8 carbon atoms, and
q is an integer of 3 to 8 provided that the cyclic skeleton in the formula (3) may contain an oxygen as a constituting member.

2. The acidic gas absorbent according to claim 1, wherein said amine compound represented by the formula (1) is selected from the group consisting of:
N-isopropyldiethanolamine,
N-isopropyldipropanolamine,
3-[(2-hydroxyethyl)(propan-2-yl)amino]propan-1-ol,
N-sec-butyldiethanolamine, N-sec-butyldipropanolamine,
N-sec-butyldibutanolamine,
3-[(2-hydroxyethyl)(butan-2-yl)amino]propan-1-ol,
N-cyclopentyldiethanolamine,
N-cyclopentyldipropanolamine, and
3-[(2-hydroxyethyl)(cyclopentyl)amino]propan-1-ol.

3. The acidic gas absorbent according to claim 1, wherein said cyclic amino compound represented by the formula (2) or (3) is selected from the group consisting of:
2-azetidinemethanol,
2-(2-aminoethyl)azetidine,
2-pyrrolidinemethanol,
2-(2-aminoethyl)pyrrolidine,
4-hydroxypiperidine,
2-piperidinemethanol,
3-piperidineethanol,
2-(2-aminoethyl)pyrrolidine,
1-(2-hydroxyethyl)piperazine, and
2-(hydroxymethyl)piperazine.

4. The acidic gas absorbent according to claim 1, comprising said amine compound represented by the formula (1) in an amount of 10 to 60 wt % and said cyclic amino compound represented by the formula (2) or (3) in an amount of to 50 wt % provided that the whole amount of the absorbent is regarded as 100 wt %.

5. An acidic gas removal method, comprising:
contacting a gas containing an acidic gas with the acidic gas absorbent according to claim 1 so as to remove the acidic gas from the acidic gas-containing gas.

* * * * *